United States Patent
Jann et al.

(10) Patent No.: US 8,132,057 B2
(45) Date of Patent: Mar. 6, 2012

(54) AUTOMATED TRANSITION TO A RECOVERY KERNEL VIA FIRMWARE-ASSISTED-DUMP FLOWS PROVIDING AUTOMATED OPERATING SYSTEM DIAGNOSIS AND REPAIR

(75) Inventors: Joefon Jann, Ossining, NY (US); James Arthur Lindeman, Austin, TX (US); Ramanjaneva Sarma Burugula, Yorktown Heights, NY (US); Ching-Farn Eric Wu, Yorktown Heights, NY (US); Kaoutar El Maghroaui, Yorktown, NY (US)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 12/537,486

(22) Filed: Aug. 7, 2009

(65) Prior Publication Data

US 2011/0035618 A1     Feb. 10, 2011

(51) Int. Cl.
*G06F 11/00*     (2006.01)
(52) U.S. Cl. .......................... 714/38.1; 714/2
(58) Field of Classification Search ................. 714/38.1, 714/38.11, 38.12, 38.13, 39, 2, 25; 717/124, 717/126, 128
See application file for complete search history.

(56) References Cited

U.S. PATENT DOCUMENTS

| | | |
|---|---|---|
| 4,713,656 A | 12/1987 | Cliff et al. |
| 5,805,886 A | 9/1998 | Skarbo et al. |
| 5,828,882 A | 10/1998 | Hinckley |
| 6,199,179 B1 | 3/2001 | Kaufmann et al. |
| 6,216,132 B1 | 4/2001 | Chandra et al. |
| 6,266,716 B1 | 7/2001 | Wilson et al. |
| 6,505,245 B1 | 1/2003 | North et al. |
| 6,549,916 B1 | 4/2003 | Sedlar |
| 6,718,482 B2 | 4/2004 | Sato et al. |
| 6,728,715 B1 | 4/2004 | Astley et al. |
| 6,754,664 B1 | 6/2004 | Bush |
| 6,829,639 B1 | 12/2004 | Lawson et al. |
| 6,910,070 B1 | 6/2005 | Mishra et al. |
| 6,910,160 B2 | 6/2005 | Bajoria et al. |
| 7,107,497 B2 | 9/2006 | McGuire et al. |
| 7,117,388 B2 * | 10/2006 | Arimilli et al. ................ 714/10 |
| 7,260,752 B2 | 8/2007 | Linam et al. |
| 7,472,067 B2 | 12/2008 | Mathur et al. |
| 7,539,986 B2 | 5/2009 | Grobman |
| 7,558,986 B2 | 7/2009 | Abe |
| 7,730,359 B2 | 6/2010 | Clarke |

(Continued)

FOREIGN PATENT DOCUMENTS

EP     1 970 807 A1     9/2008

OTHER PUBLICATIONS

Greg Shultz, Disable Windows XP's Error Reporting notification, Aug. 29, 2007.

(Continued)

*Primary Examiner* — Dieu-Minh Le
(74) *Attorney, Agent, or Firm* — McGinn IP Law Group, PLLC (57) ABSTRACT

A method (and structure) of operating an operating system (OS) on a computer. When a failure of the OS is detected, the computer automatically performs a diagnosis of the OS failure. The computer also attempts to automatically repair/recover the failed OS, based on the diagnosis, without requiring a reboot.

22 Claims, 10 Drawing Sheets

U.S. PATENT DOCUMENTS

| | | | |
|---|---|---|---|
| 7,734,945 B1* | 6/2010 | Levidow et al. | 714/3 |
| 2002/0035649 A1 | 3/2002 | Korn et al. | |
| 2002/0059380 A1 | 5/2002 | Biliris et al. | |
| 2002/0089526 A1 | 7/2002 | Buxton et al. | |
| 2002/0120884 A1 | 8/2002 | Nakamikawa et al. | |
| 2002/0124165 A1 | 9/2002 | Smith et al. | |
| 2002/0124215 A1 | 9/2002 | Austen et al. | |
| 2002/0129110 A1 | 9/2002 | Liu et al. | |
| 2003/0070114 A1 | 4/2003 | Yasuda | |
| 2003/0074601 A1 | 4/2003 | Schultz et al. | |
| 2003/0126202 A1 | 7/2003 | Watt | |
| 2003/0131039 A1* | 7/2003 | Bajoria et al. | 709/1 |
| 2003/0204780 A1* | 10/2003 | Dawkins et al. | 714/24 |
| 2004/0119736 A1 | 6/2004 | Chen et al. | |
| 2004/0153834 A1 | 8/2004 | Oshima et al. | |
| 2005/0081212 A1 | 4/2005 | Goud et al. | |
| 2005/0086491 A1 | 4/2005 | Haugh et al. | |
| 2005/0091354 A1 | 4/2005 | Lowell et al. | |
| 2005/0172279 A1 | 8/2005 | Cook et al. | |
| 2005/0204199 A1* | 9/2005 | Harper et al. | 714/38 |
| 2005/0235007 A1 | 10/2005 | Abali et al. | |
| 2006/0005085 A1 | 1/2006 | Zunino et al. | |
| 2006/0075171 A1 | 4/2006 | Wei | |
| 2006/0085792 A1 | 4/2006 | Traut | |
| 2006/0136720 A1 | 6/2006 | Armstrong et al. | |
| 2006/0265508 A1 | 11/2006 | Angel et al. | |
| 2007/0073751 A1 | 3/2007 | Morris et al. | |
| 2007/0128899 A1* | 6/2007 | Mayer | 439/152 |
| 2008/0115012 A1 | 5/2008 | Jann et al. | |
| 2008/0126780 A1* | 5/2008 | Rajkumari et al. | 713/2 |
| 2008/0235503 A1 | 9/2008 | Akpuokwe et al. | |
| 2009/0113452 A1 | 4/2009 | Grigsby et al. | |
| 2009/0138808 A1 | 5/2009 | Moromisato et al. | |
| 2009/0172471 A1 | 7/2009 | Zimmer et al. | |
| 2009/0182778 A1 | 7/2009 | Tormasov | |

OTHER PUBLICATIONS

Office Action dated Mar. 23, 2011 (U.S. Appl. No. 12/023,185).
Irving, "Paritioning Impelmentation for IBM @server p5 Servers" Feb. 2005, IBM, third edition, pp. 1-342.
Quintero, "HACMP V5.3, Dynamic LPAR, and Virtualization", 2005, IBM Red Books, pp. 1-60.
Office Action dated Jun. 23, 2010 for U.S. Appl. No. 12/023,185.
"Firmware Assisted Dump in a Partitioned Environment using Reserved Partition Memory", authors et al. IBM, IP com No. IPCOM000166859D, Original Publication Date: Jan. 25, 2008; IP.com Electronic Publication: Jan. 25, 2008. http://www.ip.com/pubview/IPCOM000166859D.
Huang, "A case for High Performance computing with Virtual Machines", 2006, ACM, p. 1-10.
Thefreedictionary, "Virtualization Definition" Thefreedictionary, p. 1, Aug. 2010.
Wikipedia, "Concurrent computing" Wikipedia, p. 1-5, Aug. 2010.
Wikipedia, "Concurrent multitasking" Wikipedia, p. 1-5, Aug. 2010.
Cartwright, "What is Concurrent Programming", Jan. 2000, www.cs.rice.edu, p. 1-5.
Office Action dated Aug. 30, 2010 for U.S. Appl. No. 11/599,272.
Written Opinion of the International Searching Authority dated Nov. 8, 2010.
Final Office Action dated Sep. 15, 2011 (U.S. Appl. No. 12/023,185).
Office Action mailed on Jun. 6, 2011, for co-pending U.S. Appl. No. 12/537,486.
International Search Report dated Nov. 3, 2011.

* cited by examiner

AUTOMATED TRANSITION TO A RECOVERY KERNEL VIA FIRMWARE-ASSISTED-DUMP FLOWS PROVIDING AUTOMATED OPERATING SYSTEM DIAGNOSIS AND REPAIR

CROSS-REFERENCE TO RELATED APPLICATIONS

The present Application is related to the following co-pending application:

U.S. patent application Ser. No. 11/599,272, filed on Nov. 16, 2006, to Burugula, et al., entitled "METHOD AND INFRASTRUCTURE FOR DETECTING AND/OR SERVICING A FAILING/FAILED OPERATING SYSTEM INSTANCE", having IBM Docket YOR920060744US1, assigned to the present assignee, and which is incorporated herein by reference.

BACKGROUND OF THE INVENTION

1. Field of the Invention

The present invention generally relates to automatically producing an accurate diagnostic report and possibly automatically reviving a crashed or hung operating system instance. More specifically, a healthy running operating system (OS) can register a recovery/repair kernel to the firmware, so that when the OS crashes or hangs is detected, this firmware copies the system kernel memory to a reserved location and then copies the repair kernel into low memory to attempt an automatic repair. If the repair is successful, the firmware will swap back to running the original kernel without a reboot.

2. Description of the Related Art

Figure 1:
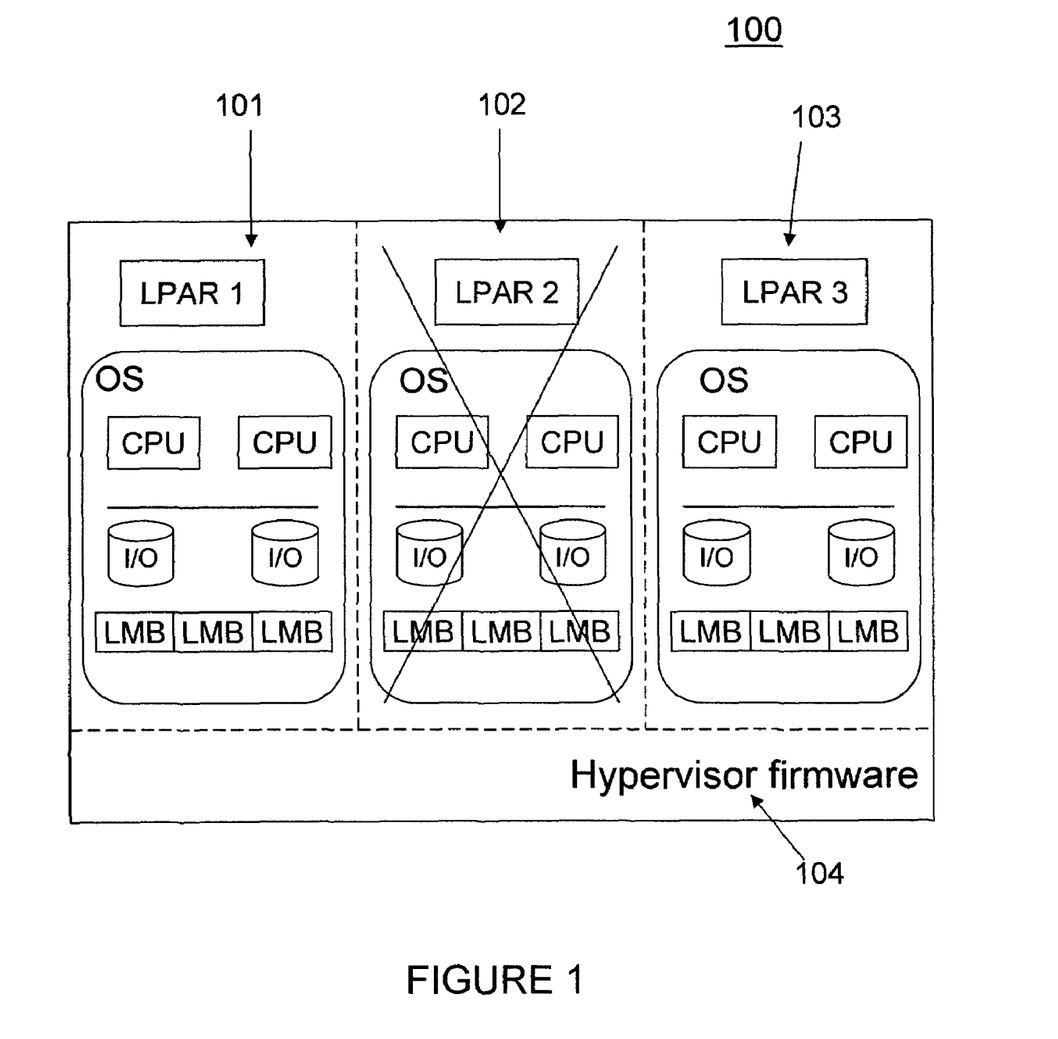
FIG. 1 shows an exemplary SMP (Symmetci Multi-Processor) server 100 having multiple OS instances 101-103 (e.g. AIX OS instances), with a failure shown in OS instance 102.

FIG. 1 exemplarily shows an exemplary block diagram 100 of an SMP (Symmetric Multi-Processor) server with one or more LPARs (Logical PARtitions), including hypervisor firmware 104 that oversees the LPAR instances 101-103. Each LPAR 101-103 run an OS instance, such as an AIX OS instance.

Currently, when an OS instance fails (crashes or hangs), as demonstrated by LPAR$_2$ 102 in FIG. 1, the customer has to collect the system dump[s] and send it over to the OS vendor's technical support team, who will then diagnose the problem using the dump. There are a few problems with this approach:

1) This process is time consuming, particularly when the dump file is huge, which is getting more prevalent as system's memory continues to increase in size.

2) The OS vendor's support team may not have access to all of the OS instance's information, in which case they will have to go through multiple iterations of system dump collection and analyses.

3) The OS instance may be too damaged to be able to dump its contents to the disk. That is, the system dump component may itself fail, leaving the system in a non-diagnosable state.

Hence, it would be beneficial to both customers and to OS vendors if an online analysis of the failing OS instance can be done, and preferably done automatically. Currently there are two approaches known to the present inventors that address parts of the above problems:

1. FirmWare Assisted Dump (FWAD)

Publication "Firmware Assisted Dump in a Partitioned Environment using Reserved Partition Memory" (IP.com# IPCOM000166859D) describes a mechanism that can be used to dump an OS instance which cannot dump its own contents to disk (the third problem listed above). FWAD works by pre-registering the OS kernel's data regions to the firmware, so that those regions can be copied to safe memory regions which are preserved across the next reboot. Then the firmware and rebooting OS instance can dump the failing OS kernel's data to the dump device.

However, the FWAD does not eliminate the requirement for off-line processing of the dump data. The customer still has to collect the dump data from a device and send it to the OS vendor's technical support team, who will analyze the dump. Moreover, this solution requires an OS reboot to occur, which can take from several minutes to a few hours to complete, a very time-consuming process.

2. An Ambulance LPAR:

This is a service partition (LPAR) in the same hardware system that contains the LPAR with the failed OS instance. The OS in this ambulance LPAR can do an online diagnosis of the failed OS, and is described in the above-identified co-pending application.

The main problem with this approach is the security concern, because all the memory belonging to the failed LPAR, including application data, is exposed to the ambulance LPAR.

Another problem with the ambulance LPAR approach is that the layout of the data structures can vary among different OS versions. So, each OS version running in the hardware system needs an ambulance LPAR that runs the same OS version, making the ambulance LPAR an expensive and hard-to-manage proposition.

Therefore, a need continues to exist for improving the servicing of failed OS instances. Particularly, it would be useful to have a mechanism that can do automated and/or online analysis of a failed OS instance, but without the drawbacks associated with the FWAD or the Ambulance LPAR as described briefly above and in the above-identified co-pending application.

SUMMARY OF THE INVENTION

In view of the foregoing, and other, exemplary problems, drawbacks, and disadvantages of the conventional systems, it is an exemplary feature of the present invention to provide a structure (and method) in which, upon failure of an OS instance, an automatic firmware assisted invocation of a diagnosis & repair kernel, and this kernel will automatically diagnose the failed OS instance.

It is another exemplary feature of the present invention to provide a structure and method for automatically attempting to repair the crashed OS instance.

It is another exemplary feature of the present invention to allow the crashed OS instance, if the automatic repair has been successful, to resume operation as an OS instance without having to perform a reboot.

Therefore, in a first exemplary aspect of the present invention, to achieve the above features and objects, described herein is a method (and structure and set of machine-readable instructions) of operating an OS instance on a computer, including detecting a failure of the OS instance and automatically performing a diagnosis of the failure, using a processor on the computer.

In a second exemplary aspect of the present invention, also described herein is a mechanism to attempt to automatically recover a failed operating system (OS) instance on a computer, the mechanism including a detector that provides an indication that an OS instance has failed; a diagnosis-and-recovery kernel embedded in a protected region of the OS instance; and memory space allocated for automatically storing information during a failure of the OS instance, wherein, upon the OS instance having been detected as failed, the diagnosis-and-recovery kernel automatically performs a diagnosis of the OS failure, using the automatically-stored information, and attempts to automatically repair/recover the failed OS instance, based on the diagnosis, without rebooting.

Thus, the present invention provides a mechanism to automatically diagnose a failed OS instance, including the capability of also automatically attempting to repair/recover the failed OS instance and resume running the fixed OS instance without requiring a reboot.

BRIEF DESCRIPTION OF THE DRAWINGS

The foregoing and other features, purposes, aspects, and advantages will be better understood from the following detailed description of a preferred embodiment of the invention with reference to the drawings, in which.

DETAILED DESCRIPTION OF AN EXEMPLARY EMBODIMENT OF THE INVENTION

Referring now to the drawings and more particularly to FIGS. 2-11, an exemplary embodiment of the method and structures according to the present invention will now be explained.

The exemplary embodiment explained in detail in the following discussion is described in the environment of AIX (Advanced Interactive eXecutive), which is the name given to a series of proprietary operating systems sold by IBM for several of its computer system platforms, based on UNIX System V with 4.3BSD-compatible command and programming interface extensions. However, the concepts of the present invention are clearly more general than this specific environment.

The present invention provides a mechanism that will automatically produce an accurate diagnostic report and, possibly, revive a crashed or hung AIX OS instance, hence reducing outages and service time. Such automation of diagnosis and recovery is much more effective than a remote technical support team of people trying to obtain and analyze (possibly huge) dumps.

The present invention will reduce the time and costs of diagnosing critsits (e.g., "critical situations", meaning critical product failures that usually involve executive level engagement) caused by OS hangs and crashes, because a large amount of diagnosis can be automated, with immediate notifications to system administrators, and the diagnosis/repair can be more effective and accurate because of the availability of much more information. The invention will, therefore, be a very useful feature in "Lights-Out" data centers.

The "Lights-Out/Touchless Systems" terminology refers to systems typically managed remotely without the ability of the system administrators to have physical access to the system in any reasonable time frame. These "Lights-out" systems are viewed as the next generation of the IT infrastructure deployment, which enables one to take the advantage of labor arbitrage using skills from the BRIC (Brazil, Russia, India, China) countries, while placing the servers in geopolitical stable countries like Germany, England, the US, etc. For example, this hybrid approach is vigorously pursued by IT leaders worldwide, including SAP® (of Germany, for their business software as Service outsourcing), IBM®, Infosys® (India), TCS® (India) and a number of University-based companies in China, etc.

As explained briefly above, when an OS crashes or hangs, the same instance of that OS kernel cannot be used or trusted to analyze and repair itself. The only option currently available is for the kernel to trigger a memory dump by the platform and reboot.

There exist mechanisms for the OS to pre-register its kernel memory in this event so that the contents of that memory can be copied to a safe reserved location higher up in memory. By having the firmware/hypervisor copy the memory contents and register states associated with the crashed kernel into a reserved region of memory, a rebooted instance of the OS kernel can then write all of the system state associated with the crash to disk. That mechanism is described in "Firmware Assisted Dump in a Partitioned Environment Using Reserved Partition Memory", as described in IPCOM000166859D. However, this solution still requires a reboot, which can take from several minutes to several hours to complete, depending on the size of the system.

Thus, the present invention provides a method for online diagnosis, repair, and, possibly, recovery of an OS instance by augmenting the Firmware Assisted Dump invention mentioned above to transfer control to a diagnosis-and-recovery OS kernel, instead of simply rebooting. This new kernel is a specially-designed diagnosis-and-recovery OS kernel, referred to herein as a "repair kernel", and is bundled with the OS that was originally booted. In operation, this diagnosis-and-recovery kernel, together with the necessary device drivers and diagnosis scripts, will be placed into a hidden contiguous real-address memory region of the running OS. After taking control, the repair kernel would inspect the state of the crashed OS and then attempt to manipulate the memory and saved register state to make it healthy again.

The formerly-broken kernel could then continue with normal operation, without having to be rebooted. This solution, if properly automated, would reduce the system downtime and provide an improvement over the conventional state of the art, since a few seconds of repair-kernel operation is generally more preferable compared to an OS reboot, which may cause a fair amount of disruptions and loss of states.

Thus, the Firmware Assisted Dump mechanism described in the aforementioned publication uses a registration mechanism for the OS to specify to firmware which regions of memory it wants to preserve and where those regions should be copied. Likewise, it also lets the OS specify where in memory that firmware should place a copy of the registers' states at the point of the crash. These different requests are conveyed as different dump sections in the registration call.

The present invention uses new types of dump sections, in which the OS specifies the location and size in memory of the repair kernel, along with the registers' states and page-able entries it needs loaded when firmware transfers control to the repair kernel.

The firmware would recognize these new dump sections during the registration call. When a Firmware Assisted Dump trigger occurs, the firmware still copies the crashed OS kernel memory to the location in memory reserved for it. However, after that memory copying is complete, the firmware then copies the repair kernel into low memory and loads its registers' states and page-table entries, instead of rebooting.

The repair kernel then has full control to read and overwrite the states of the crashed kernel. Once finished with the repairs, the repair kernel registers with the firmware the original kernel's memory and registers' states, to enable firmware to swap control back to the original kernel.

In the following discussion, the contents of this memory region are referred to as the Automated LPAR Diagnosis and Recovery (ALDR) image.

The ALDR image includes the ALDR kernel, a few device drivers, some commands, and a table containing addresses of key items from the original OS before it crashes. This memory region where the ALDR image resides will be hidden from the normally running OS instance, so that the OS cannot inadvertently modify the ALDR image. When the OS fails (crashes or hangs), the ALDR kernel from the ALDR image will take control, and will inspect the state of the crashed OS (memory+registers+I/O devices) to diagnose the cause of the failure. If it can determine the cause and has a repair action that can revive the OS, the ALDR image will manipulate the memory and saved registers' states of the crashed OS to fix the problem, and then transfer control back to the original OS, which can then continue its normal operation.

This ALDR solution can reduce OS downtime but does not have the problems of the ambulance LPAR. Moreover, in the case of IBM AIX, when combined with the Active Memory Sharing technology, the memory overhead of this ALDR solution can be much reduced.

Figure 2:
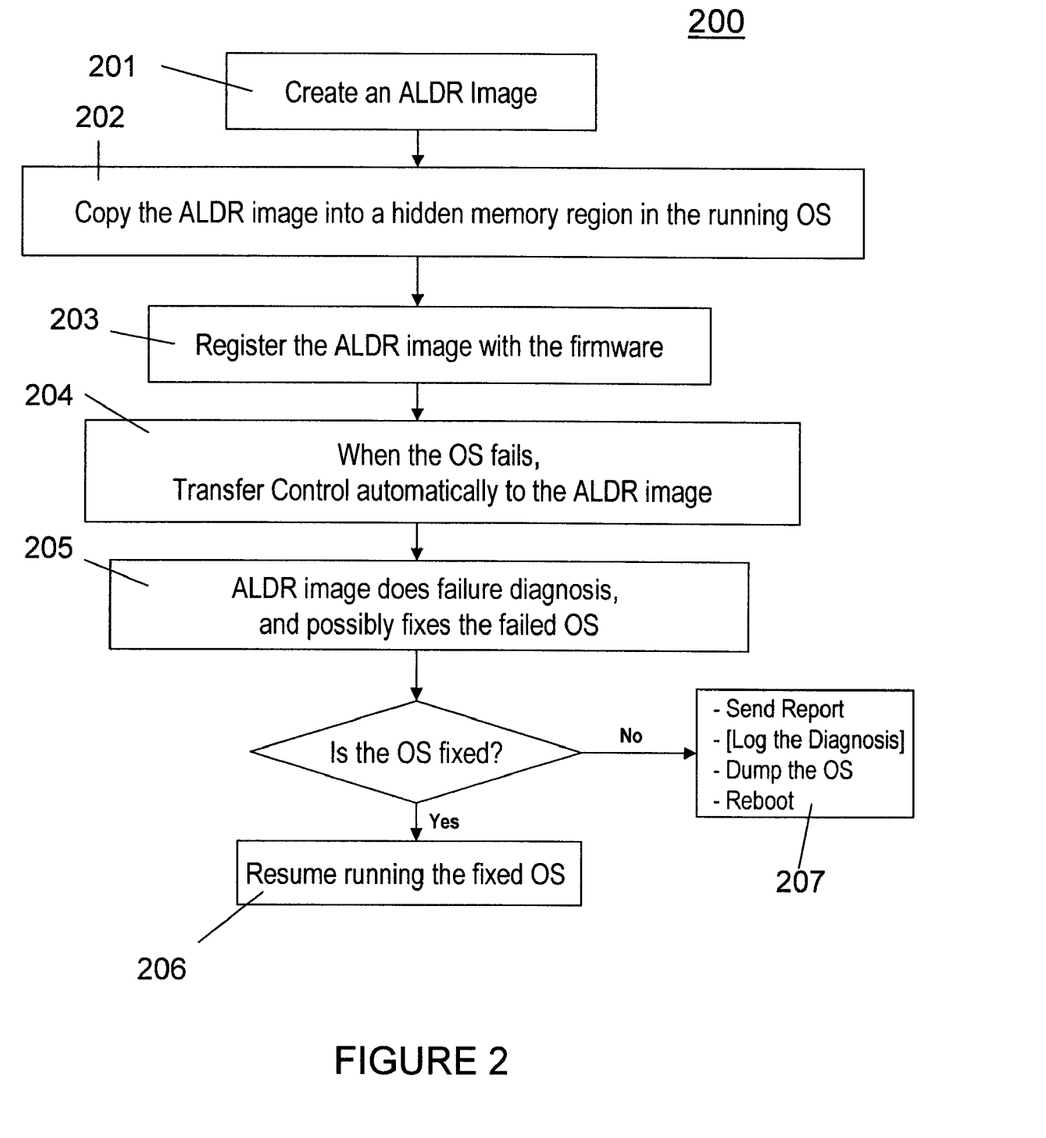
FIG. 2 shows an exemplary flowchart 200 of the method of the present invention.

In providing a mechanism to enable online diagnosis and recovery of a failed OS instance, the present invention utilizes some of the technologies and concepts developed from the Firmware Assisted Dump technology and the Ambulance LPAR technology. FIG. 2 shows an exemplary flowchart 200 of the present invention. The following steps describe this invention in more details.

A. Create an ALDR (Automated LPAR Diagnosis and Recovery) image (step 201).
B. Copy the ALDR image into a memory region that is hidden from the normal running OS instance (step 202).
C. Register the ALDR image with the firmware. When the running OS fails, control will be transferred to the ALDR image (step 203 & step 204).
D. Diagnose and if possible, repair the failed OS instance (step 205).
E. If fixed,
    send a repair report, and reinstate the running of the original kernel (step 206); else send a diagnosis report, create a dump, and reboot (step 207).

Step 201: Create an ALDR (Automated LPAR Diagnosis and Recovery) Image

The contents of an ALDR image consist of an ALDR OS kernel, a few device drivers, and diagnosis and repair programs. When the system administrator wants to ALDR-enable a running OS instance, the administrator will issue a user command (e.g. aldrEnable) which will gather all the required components (kernel, device drivers, diagnose and repair programs) to create the ALDR image with OS-instance-specific information.

Step 202: Copy the ALDR Image into a Memory Region that is Hidden from the Memory of the Normal Running OS Instance Once the ALDR image is created, it is copied into a memory region of the LPAR that is hidden from the running OS instance. To minimize the work needed to access the ALDR image after the OS fails, the ALDR image can be placed into a contiguous memory region. This memory region must be hidden from the running OS to avoid modifications by the running OS or its applications.

This mechanism also needs to reserve hidden real memory space for saving the state of the failed OS, which includes, for example, the memory region with translation-off, registers' states, and page-table entries. The failed OS's state needs to be saved because the firmware will overwrite these parts of the failed OS instance with the contents from the ALDR image. For example, when the firmware boots an OS, it requires the OS to be in the translation-off addressable part of the memory.

When the original OS instance fails, the firmware copies the ALDR kernel into the translation-off memory region. Additionally, because the ALDR diagnosis programs may need to check the translation-off portion of the failed OS instance that was overwritten by the ALDR kernel, those memory contents need to be saved before bringing in the ALDR kernel.

Steps 203/204: Register the ALDR Image with the Firmware and when the Running OS Fails Control Will be Transferred to the ALDR Image.

After copying the ALDR image from disk into memory, the OS has to register with the firmware the location of the ALDR image. The Firmware Assisted Dump has a mechanism for the OS to specify to firmware where in memory the firmware should place a copy of the OS's state at the point of an OS failure. This invention uses new types of dump sections in which the OS specifies the location and size in memory of the ALDR image, the registers' states, and the page-table entries that need to be loaded when firmware transfers control to the ALDR kernel when the OS fails. The firmware will recognize these new dump sections during the registration call.

The Firmware Assisted Dump function currently available on AIX6.1 on POWER6 platforms only has dump sections for saving the prior OS's kernel-memory and register states. The present invention adds new registration-sections to inform the hypervisor about the repair kernel.

When the OS fails, a Firmware Assisted Dump trigger occurs. The firmware then copies the failed OS's state into the above-specified reserved, hidden save-area in memory. After the copying is complete, the firmware then copies the ALDR kernel into low memory and loads its page-table entries & registers' states, instead of rebooting. The ALDR kernel then has full control to read and overwrite the state of the crashed kernel.

Step 205: Diagnose and if Possible, Repair the Failed OS Instance

The ALDR image will diagnose the cause of failure of the failed OS instance by accessing its memory, registers' states, and I/O devices. It is assumed that the ALDR image can access the standard filesystems and paging space of the failed OS instance, in order to determine the cause of the failure. The implementation of the diagnosis and repair programs is specific to the OS type and version. In generic terms, diagnosis and repair involves the following steps:

i. Check the error report entries stored by the failed OS instance, for hints about the cause of the failure.
ii. Verify and fix all damaged kernel data structures to ensure that they have valid contents.
iii. Check all the processes to find if there were dead-locks.
iv. Check the kernel tunable parameters to determine if they were incorrectly set.
v. Check if any of the critical filesystems were 100% full. If so, the ALDR image can either increase the filesystem size if possible, or delete some junk files.

It is noted that the same diagnosis logic described in the above-identified co-pending Application can be used for some of these steps. A key distinction is that, in the present invention, the diagnosis/repair is being performed in the same LPAR, as opposed to running on a separate Ambulance LPAR in the same SMP.

Steps 206/207: If Fixed Send Repair Report and Reinstate the Running of the Original OS Instance; Else Send Diagnosis Report Create a Dump & Reboot.

After the ALDR image has completed the diagnosis and successfully repaired the failed OS, it can use the FWAD infrastructure to reinstate the running of the original OS. More precisely, the ALDR kernel informs the firmware the location of the saved states of the original OS, and instructs firmware to transfer control back to the original OS. Hence the original OS instance is automatically recovered, i.e. continues to run without a reboot. A repair report can be sent to the system administrators and also logged into a file.

In situations in which the failed OS cannot be repaired, a diagnosis report will/should be sent to the administrator, and a dump plus reboot of the original OS can be triggered.

Details of a Concrete Implementation

The following discussion, related to FIGS. 3-7, provides additional details based on an exemplary concrete embodiment of the present invention described above, as implemented in the AIX environment.

Figure 3:
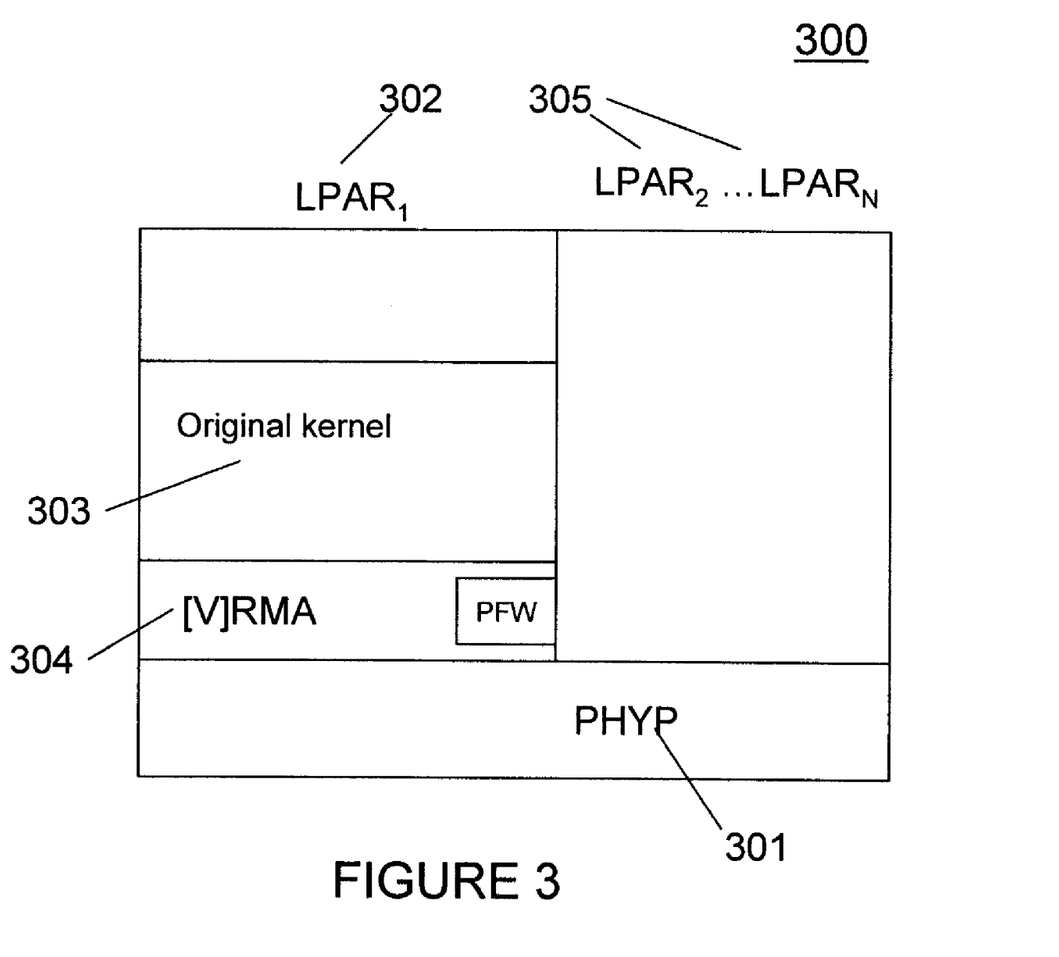
FIG. 3 shows an AIX environment 300 used to demonstrate details of an exemplary concrete embodiment of the present invention.

FIG. 3: In scenario 300 shown in FIG. 3, the firmware PHYP 301 boots up an original AIX OS image in LPAR$_1$ 302. As part of the boot up process, PHYP 301 passes to the AIX kernel 303 the sizes of (a) the [V]RMA memory 304, (b) [V]RMA page-table entries, (c) the registers' save-area. Each additional LPARs 305 (e.g., LPAR$_2$, ... LPAR$_n$) that has also been booted, could likewise utilize the present invention in the manner described for LPAR$_1$, using the sequence described below for LPAR$_1$.

Figure 4:
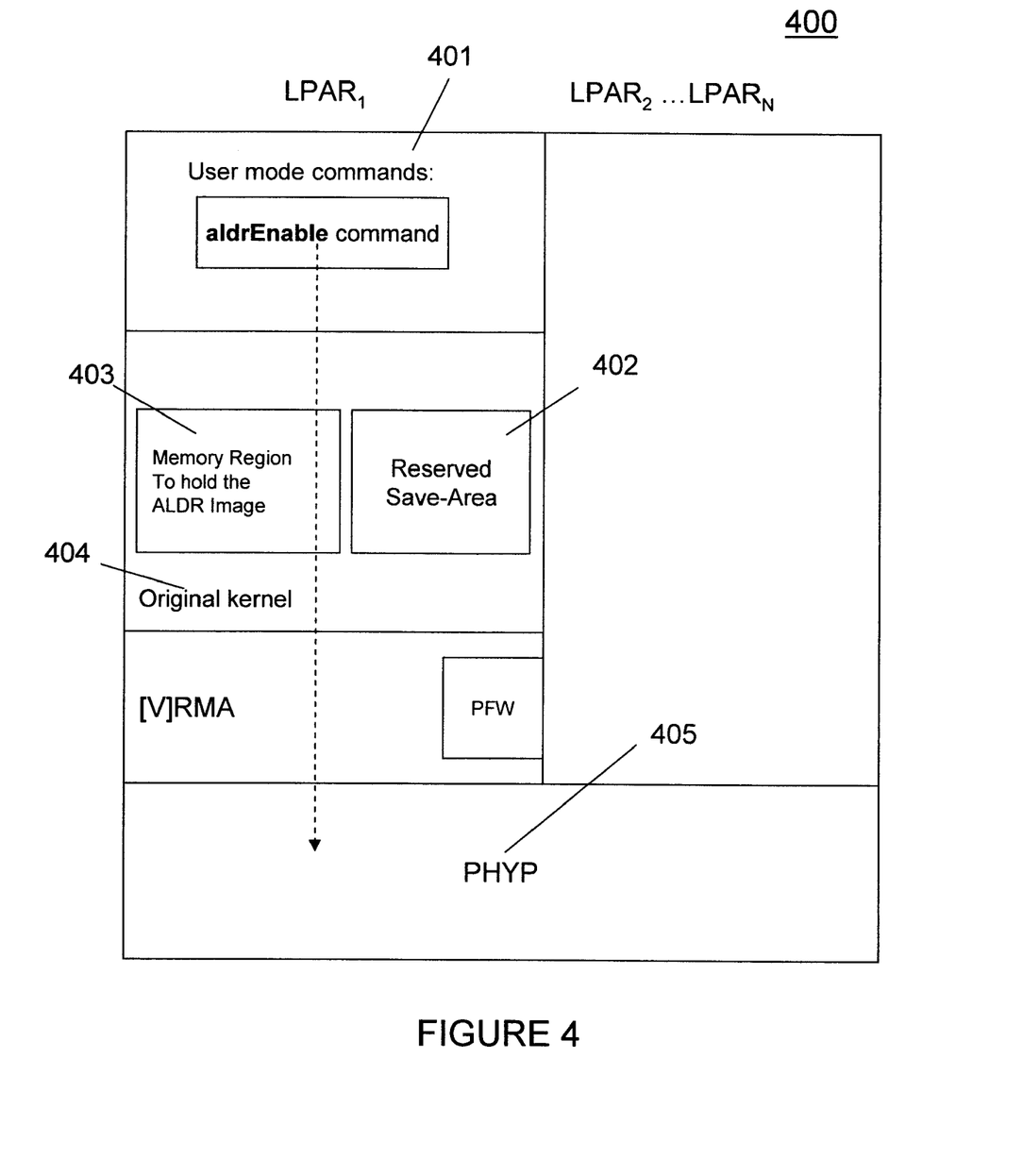
FIG. 4 shows the sequence 400 of setting up the exemplary AIX environment for the present invention.

FIG. 4: In the setup scenario 400 shown in FIG. 4, the system administrator (SysAdmin) issues the new aldrEnable command 401, which:
1. Sets aside enough Reserved AIX-Real Mem (SaveArea) 402 to store the AIX status, i.e., (a) parts of the original [V]RMA, (b) The [V]RMA page table entries, and (c) the registers' values;
2. Creates an ALDR repair image 403 from the current OS image, device drivers, etc,
3. Allocates space (the ALDR Memory Region) to hold the ALDR image and copies the ALDR image 403 into the region,
4. Hides the ALDR Memory Region and the Reserved Areas from the running AIX OS instance 404, so that the OS 404 does not accidentally overwrite these areas 402, 403.

Figure 8:
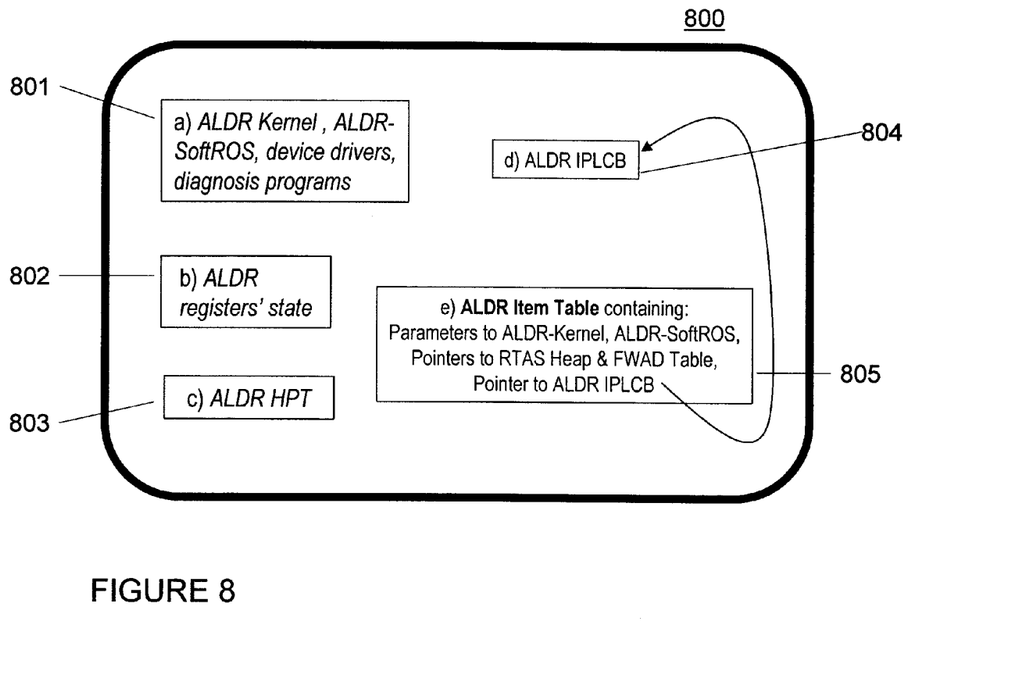
FIG. 8 shows additional details 800 of the ALDR Reserved-Memory 403,402.

Details of the Contents of the ALDR Image 403 is Depicted in FIG. 8.

The reserved save-area 402 is reserved for saving: (a) parts of the [V]RMA, (b) the [V]RMA page table entries, and (c) the registers' values.

In step 405, the AIX kernel informs PHYP (via RTAS) the locations of the ALDR repair image 403 and the Reserved Save-area 402 to store crash status/info.

Figure 5:
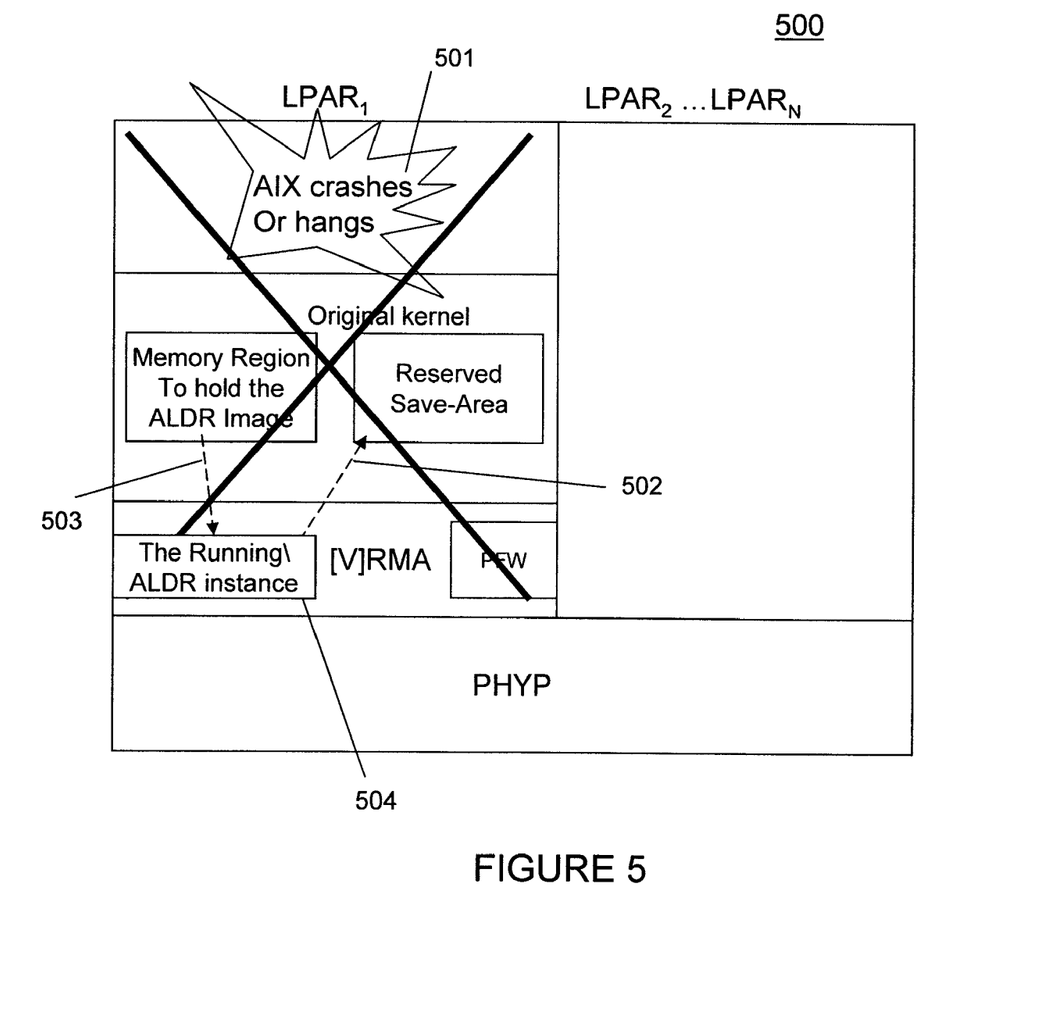
FIG. 5 shows an exemplary sequence 500 that occurs when an OS instance crashes, including the invocation of the ALDR repair image by the firmware.

FIG. 5 depicts a failure (crash or hang) of the AIX OS instance in LPAR$_1$.

The PHYP firmware will then invoke the ALDR repair image 403 as follows:
i. Saves the crashed OS's status into the Reserved SaveArea, by copying, in step 502:
   (a) parts of [V]RMA,
   (b) the [V]RMA page-table entries,
   (c) the registers' states (same as in a FWAD, mentioned above in the background discussion).
ii. In step 503, copies parts of the ALDR repair image 403 from the ALDR Memory Region to the [V]RMA (At this point, FWAD would start to reboot the original OS, but our invention will not do so. Instead we do step iii below).
iii. Passes control to the ALDR image in [V]RMA, so that ALDR instance 504 is now executing in lower memory.

Thus, in FIG. 5, the ALDR image 504 diagnoses the problem[s] in the original AIX OS image and, if possible, fixes it. The steps taken will be logged, and the steps are particularly essential in case a rollback is needed, when these steps fail.

Figure 6:
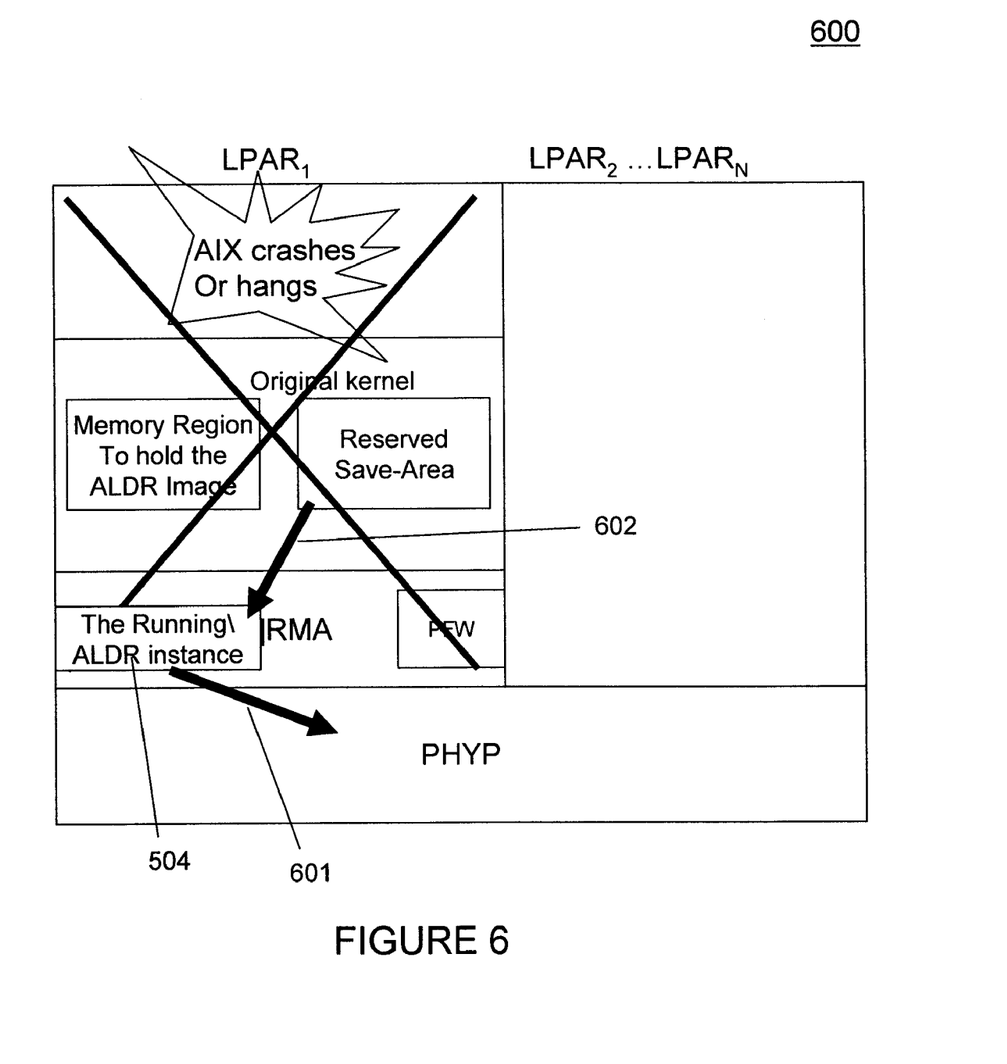
FIG. 6 shows the sequence 600 wherein the firmware passes control to the ALDR image for diagnosis and possible fix.
Figure 7:
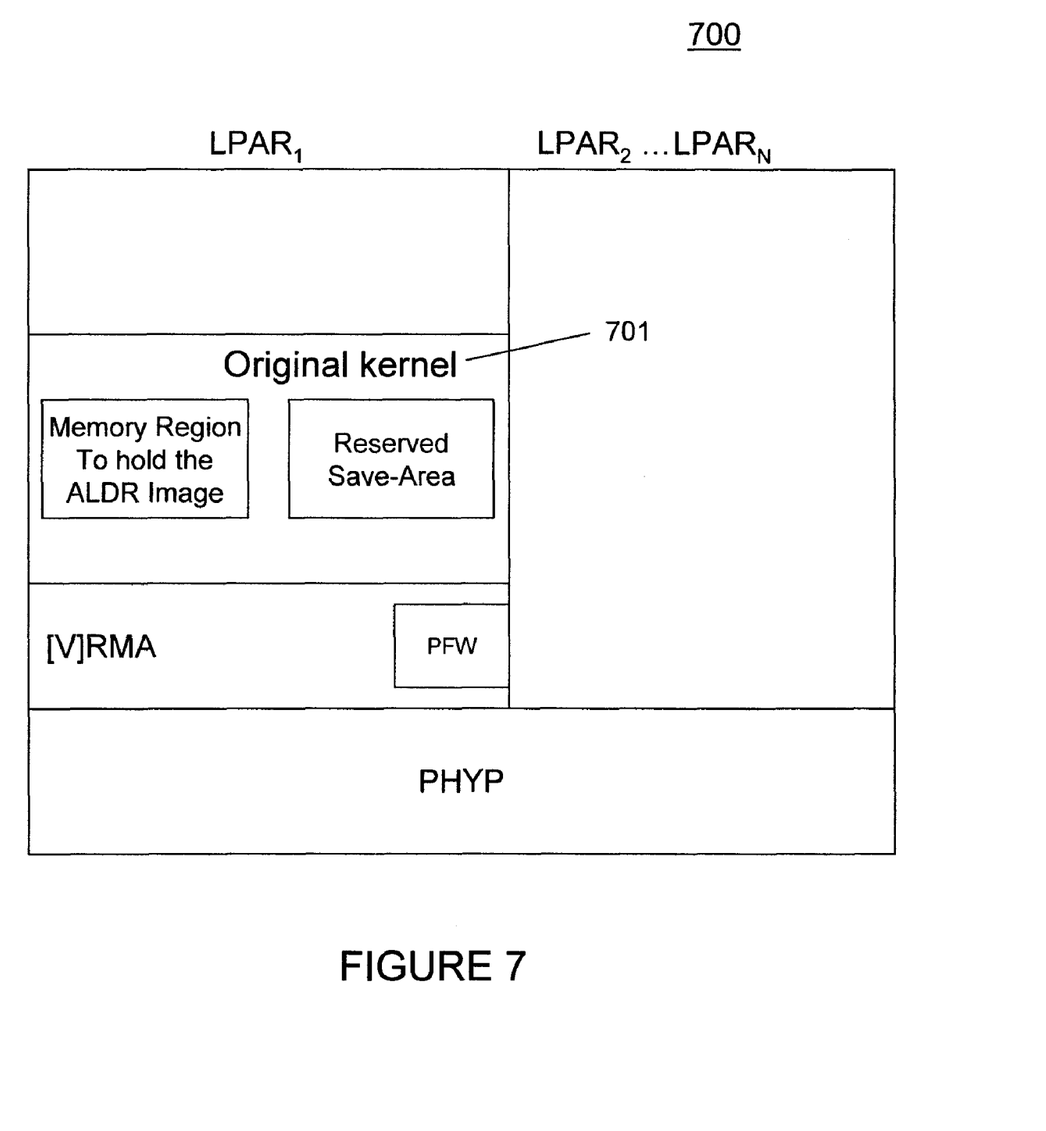
FIG. 7 shows the AIX environment 700 after the crashed OS instance has been successfully repaired by the ALDR image.

FIG. 6: In scenario 600,
IF the running ALDR instance 504 is able to fix the original-AIX-instance, it will create a treatment report including the steps taken, and will inform PHYP in step 601 to restore the fixed original-AIX-instance as follows:
   The running ALDR instance 504 informs PHYP [via RTAS] to
   a) copy back the fixed original-AIX-image data (step 602),
      i.e. PHYP restores the [V]RMA data, [V]RMA page-table entries & registers' states from the Reserved saveArea; and
   b) pass control back to the fixed original-AIX image, (as depicted in scenario 700 shown in FIG. 7, wherein original-kernel 701 resumes control and runs.
IF the running ALDR instance 504 is unable to repair the AIX instance, it will:
   a) log [and report] actions tried,
   b) optionally, do a FWAD, and
   c) reboot the original AIX OS instance.

FIG. 8 shows additional details of the Reserved ALDR Memory Region 800, mentioned in 403 in FIG. 4. We also refer to this ALDR Memory Region as the "blue box". The contents of this blue box are selected/created at the time the system administrator issues the aldrEnable command based on (i) the configuration of the LPAR in which the OS instance is running and (ii) the memory region[s] available to that OS's LPAR at the instant the aldrEnable command is issued. These contents include:
   a) A minimal list of executable programs 801 that are necessary to diagnose and repair the failed OS instance.
   b) Hardware state information required by the Firmware to load the ALDR repair kernel, such as registers' states 802, and
   c) ALDR HPT (Hardware Page-Table) entries 803.

d) A data structure called ALDR Initial Program Load Control Block (ALDR IPLCB for short) 804, which contains the details of hardware configuration so that the ALDR kernel can initialize its data structures correctly.

e) A table called the ALDR Item Table 805 containing and pointing to important information about the OS instance which needs to be diagnosed.

The aldrEnable command, as described in FIG. 4, performs the following steps before ait registers the ALDR image with firmware:

1) Allocates Real Memory for the ALDR Memory Region.
2) Creates an ALDR image 801 on a disk.
3) Copies the ALDR image 801 into the ALDR Memory Region,
4) Initializes the following items in the ALDR Memory Region:
   a) Initialize the registers for 1 SMT and put these values 802 into the ALDR Kernel in the ALDR Memory Region,
   b) Initializes the ALDR-HPT-entries 803 for the ALDR kernel in the ALDR Memory Region.
   c) Creates an ALDR-IPLCB 804 in the ALDR Memory Region, based on the IPLCB of the failed OS instance. The ALDR-IPLCB is creating by removing a lot of unnecessary hardware information from the failed OS's IPLCB (e.g. removing processors & devices which the ALDR kernel is not going to use).
   d) Initializes the aldrItemTable 805 in the ALDR Memory Region.

Just after PHYP has transferred control to the ALDR kernel, the ALDR-SoftROS and ALDR-kernel identify the address of the ALDR Item Table and retrieve the necessary information about the sick OS instance from that table. Once the ALDR kernel consumes those values from the ALDR Item Table, it is ready to perform diagnosis and repair on the sick OS image.

Figure 9:
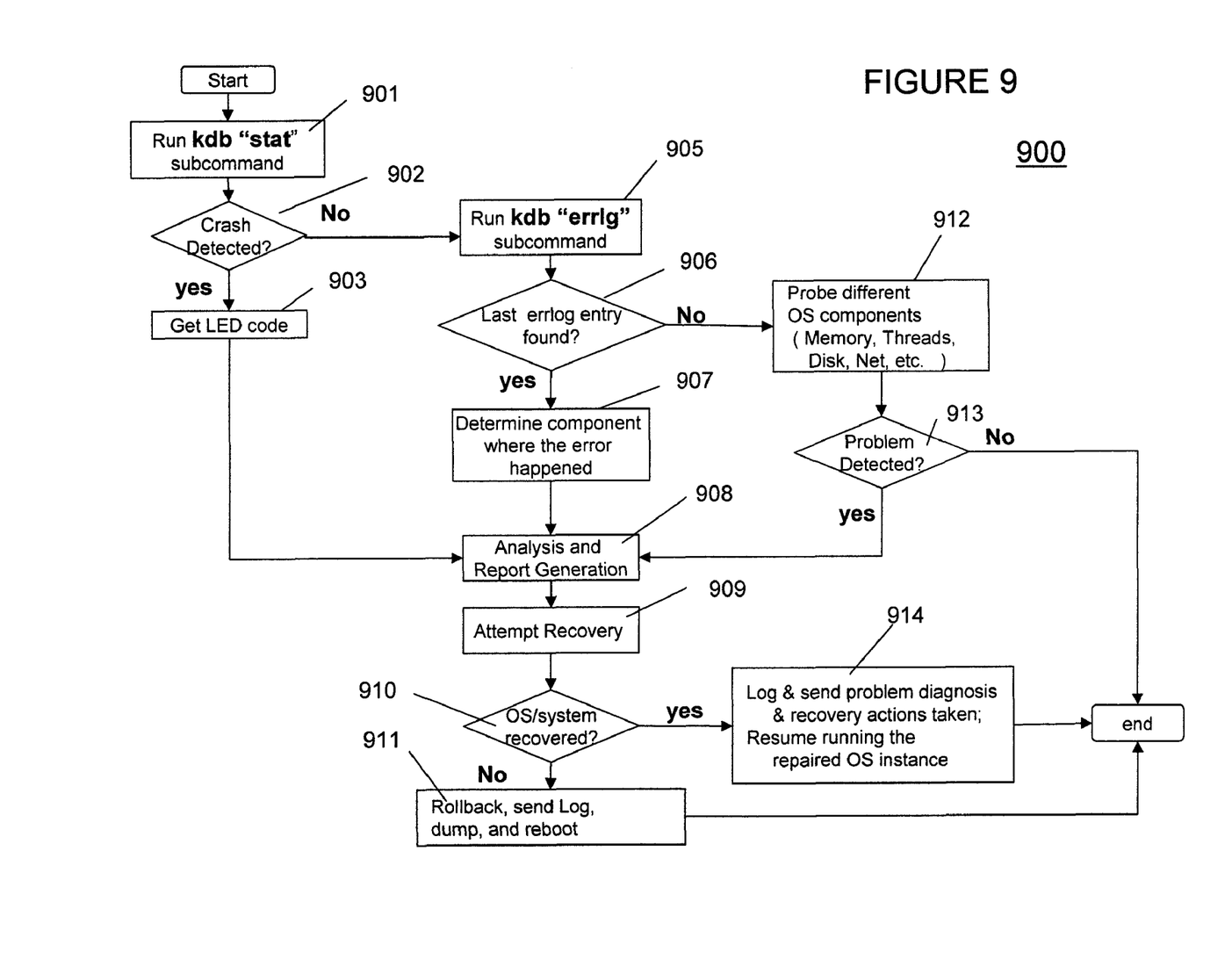
FIG. 9 shows exemplarily a flowchart 900 of the diagnosis and repair sequence.

FIG. 9 shows an exemplary flowchart 900 of the diagnosis/repair processing executed by the diagnosis and repair program. The diagnosis and repair scripts in the ALDR image use the kdb (kernel debugger) tool available in AIX for the diagnosis and repair of the sick OS instance. The AIX kdb tool consists of a large number of subcommands to assist in diagnosis of a system dump. kdb and it subcommands can also be used by the ALDR diagnosis and repair scripts, by slightly modifying the kdb tool to use the memory belonging to the sick OS instead of reading a dump file. In step 901, the "stat" subcommand of kdb is issued to identify the status of the sick OS. If a crash is detected in 902, the ALDR diagnosis script gets the LED code of the crash in 903 and invokes the analysis script specific to that LED code in step 908. If no crash was detected in step 902, then the diagnosis script issues the "errlg" kdb subcommand in step 905 to check if the sick OS has logged any entry in AIX's error log. If an entry is found in step 906, then the diagnosis script determines the component which generated that entry in step 907 and invokes the analysis script specific to that component in step 908. If no error log entry was found in step 906, then the diagnosis script probes all the AIX OS components such as Processes, Memory, Threads, Disk subsystems, etc. in step 912. The probing involves observing the key data structures in each component and looking for any error condition. If an error is detected in step 913, then the analysis script corresponding to that component is invoked in step 908 for further analysis and report generation. If no error was detected in step 913, then the diagnosis script ends, which implies that ALDR was unsuccessful in diagnosis and repair the sick OS. After the analysis script has completed an exhaustive analysis of the sick OS in step 908, and has identified a known problem, a recovery procedure is attempted in step 909. If in step 910 it was found that the ALDR recovery script was able to recover the sick OS, then the diagnosis and recovery actions/reports are logged in step 914, and the ALDR repair-OS will be terminated and the repaired OS will be brought back by the Firmware. If system was not recovered in step 910, then the repair actions will be rolled back, a log of the diagnosis will be generated, and the original un-modified AIX (usually from disk) will be rebooted by the firmware in step 911.

Exemplary Hardware Implementation

Figure 10:
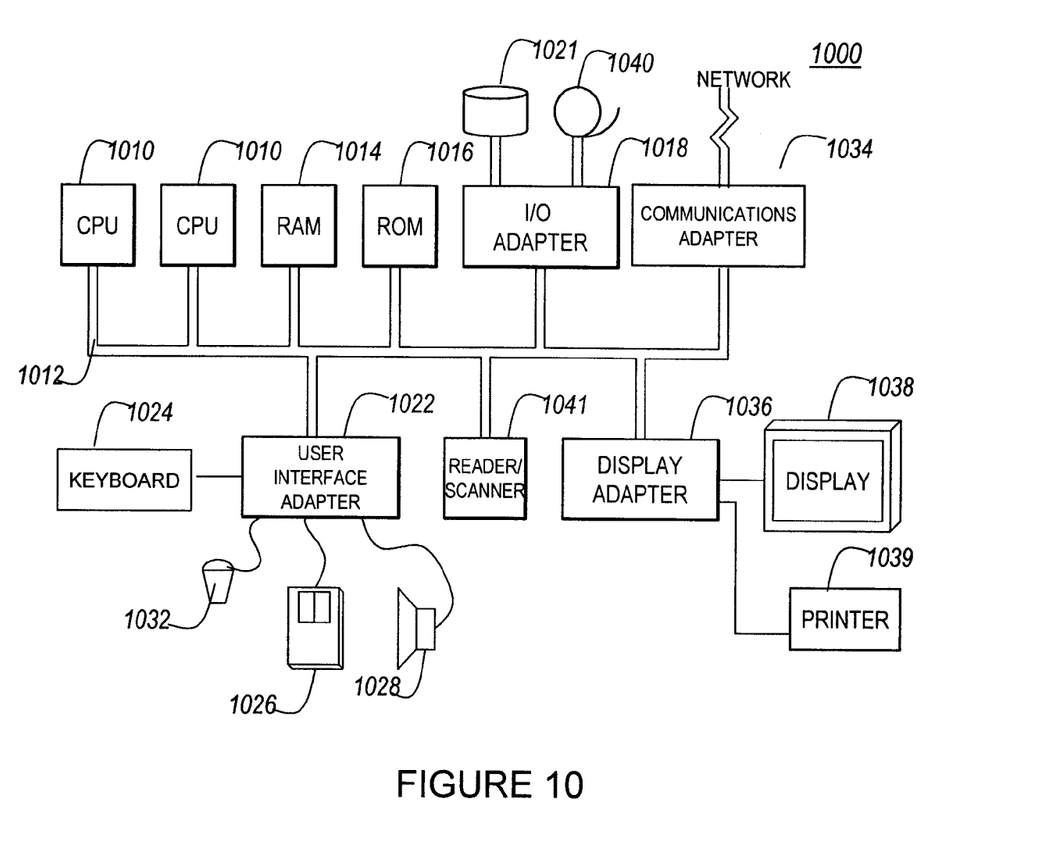
FIG. 10 illustrates an exemplary hardware/information handling system 1000 that could be used for implementing the present invention therein.

FIG. 10 illustrates a typical hardware configuration of an information handling/computer system in accordance with the invention and which preferably has at least one processor or central processing unit (CPU) 1010, as might be utilized on a server with an AIX operating system, as described for the exemplary embodiment described above, since this architecture conveys the shared "system bus" architecture typically associated with hypervisor-based computer systems. It is noted, however, that a high-end server, such as would typically be used to embody the present invention, may not have such ancillary components such as the speaker, microphone, printer, etc.

The CPUs 1010 are interconnected via a system bus 1012 to a random access memory (RAM) 1014, read-only memory (ROM) 1016, input/output (I/O) adapter 1018 (for connecting peripheral devices such as disk units 1021 and tape drives 1040 to the bus 1012), user interface adapter 1022 (for connecting a keyboard 1024, mouse 1026, speaker 1028, microphone 1032, and/or other user interface device to the bus 1012), a communication adapter 1034 for connecting an information handling system to a data processing network, the Internet, an Intranet, a personal area network (PAN), etc., and a display adapter 1036 for connecting the bus 1012 to a display device 1038 and/or printer 1039 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing storage media.

Thus, this aspect of the present invention is directed to a programmed product, comprising signal-bearing storage media tangibly embodying a program of machine-readable instructions executable by a digital data processor incorporating the CPU 1010 and hardware above, to perform the method of the invention.

Figure 11:
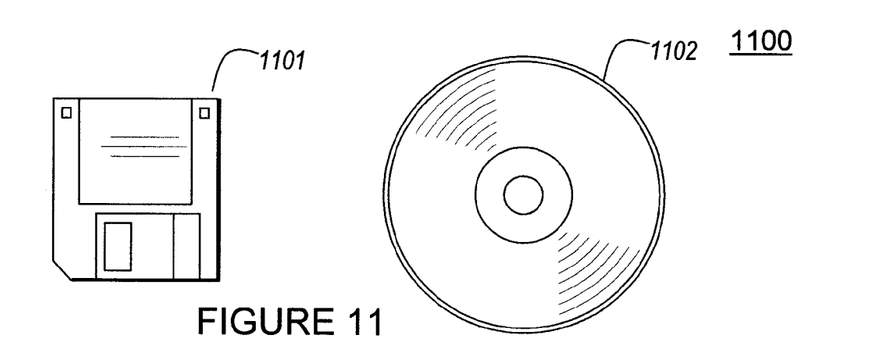
FIG. 11 illustrates signal bearing storage media 1100 (e.g., storage mediums) for storing steps of a program of a method according to the present invention.

This signal-bearing storage media may include, for example, a RAM contained within the CPU 10010, as represented by the fast-access storage for example. Alternatively, the instructions may be contained in another signal-bearing storage media, such as a magnetic or optical data storage diskette 100 (FIG. 1), directly or indirectly accessible by the CPU 1010.

Whether contained in the diskette 100, the computer/CPU 1010, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing storage media, including storage media in transmission media, whether using digital or analog format, and including memory devices used in transmission media such as communication links and wireless devices.

In an illustrative embodiment of the invention, the machine-readable instructions may comprise software object code.

The present invention has been described in an exemplary embodiment using AIX. However, the concepts described herein clearly go beyond AIX, since even the exemplary embodiment demonstrates that any OS having a hypervisor-like component that could support a repair-image registration mechanism and the underlying VM/LPAR OS utilizing that registration mechanism. As one example, Microsoft's Hyper-V, in conjunction with Windows Server 2008 (the LPAR's OS) could implement the present invention.

Moreover, it should be clear to one having ordinary skills in the art that the concepts of the present invention could be extended to any OS environment supported by firmware that could register an OS diagnosis/repair kernel, such that this diagnosis/repair kernel could be automatically activated upon an indication to the firmware of a failure of OS.

While the invention has been described in terms of an exemplary embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A method of operating an operating system (OS) instance on a computer, said method comprising:
   detecting a failure of said OS instance; and
   automatically performing a diagnosis of said OS failure, using a processing code on said computer that is created from the originally-booted OS instance itself, before an occurrence of failure, and is located in a hidden memory region associated with said OS instance.

2. The method of claim 1, further comprising using said processing on said computer to attempt to automatically repair/recover said failed OS, based on said diagnosis, without requiring a reboot.

3. The method of claim 2, wherein said automatic diagnosis/repair/recovery of said failed OS instance comprises:
   creating a diagnosis-and-recovery kernel using parts from said OS instance as originally booted, on said computer;
   hiding the memory region containing said diagnostic-and-repair kernel from its associated running OS instance; and
   registering a memory location of said diagnosis-and-recovery kernel with the firmware on said computer that controls said OS instance,
   wherein, upon said failure of said OS instance, said firmware automatically transfers control to said diagnosis-and-recovery kernel image.

4. The method of claim 3, further comprising:
   providing a user command that enables said diagnosis-and-recovery kernel by creating an image of said diagnosis-and-recovery kernel in a protected region of said OS instance; and
   allocating protected memory region/space for storing information during a failure of said OS instance.

5. The method of claim 4, wherein said protected region of said OS instance comprises a contiguous real-address memory region of said OS instance that is hidden from said OS instance during a normal operation of said OS instance.

6. The method of claim 5, wherein said failure of said OS instance is at least one of:
   detected by said firmware; and
   reported to said firmware for action.

7. The method of claim 6, wherein, upon detecting a failure of said OS instance or receiving a notification of said failure, said firmware automatically saves a state of said OS instance into said protected region.

8. The method of claim 7, further comprising, upon saving said OS instance's state into said protected region, said firmware invokes said diagnosis-and-recovery kernel to execute said diagnosis of said OS instance failure.

9. The method of claim 8, further comprising:
   automatically attempting to repair said failed OS instance;
   if said failed OS instance can be repaired, said firmware reloads the repaired OS instance and passes control back to said repaired OS instance for resuming operation without rebooting said OS instance; and
   if said failed OS instance cannot be repaired, said firmware transmits a diagnosis report of said failed OS instance.

10. The method of claim 1, wherein said OS comprises an OS instance, as supported by a firmware with a hypervisor.

11. The method of claim 10, wherein said OS instance is implemented on a SMP (Symmetric Multi-Processor) server with LPARs (Logical PARtitions), including a hypervisor firmware that oversees the LPARs, said method automatically performing diagnosis in the same LPAR instance as the LPAR instance where a failure in the OS has been detected.

12. The method of claim 11, wherein said computer comprises an SMP server having a plurality of LPARs (Logical PARtitions) each running an OS instance with a diagnosis-and-recovery kernel in an ALDR (Automated LPAR Diagnosis and Recovery) image.

13. The method of claim 12, said ALDR image comprising:
   an ALDR kernel;
   a plurality of device drivers;
   a plurality of commands; and
   a table containing addresses of key items from the OS instance before it crashes.

14. A tangible computer-readable storage medium tangibly embodying a program of machine-readable instructions executable by a digital processing apparatus to perform the method of claim 1.

15. An apparatus, comprising:
   at least one processor executing at least one operating system (OS) instance,
   wherein, when a failure of said OS instance is detected, said processor automatically performs a diagnosis of said OS failure, using a section of processing code created from the originally-booted OS instance itself, before an occurrence of failure, and located in a hidden region in a same LPAR (Logical PARtition) as the failed OS instance.

16. The apparatus of claim 15, wherein said processor also automatically attempts to repair/recover said failed OS instance, based on said diagnosis, without a reboot.

17. The apparatus of claim 16, wherein said failed OS comprises an OS instance, and said automatic diagnosis/repair/recovery of said failed OS instance comprises:
   creating a diagnosis-and-recovery kernel using parts from said OS instance as originally booted on said apparatus;
   hiding a memory region containing said diagnosis-and-repair kernel from its associated running OS instance; and
   registering a memory location of said diagnosis-and-recovery kernel with a firmware on said apparatus that controls said OS instance, wherein, upon said failure of said OS instance, said firmware automatically transfers control to said diagnosis-and-recovery kernel image.

18. The apparatus of claim 17, wherein a user command is provided that enables said diagnosis-and-recovery kernel by creating an image of said diagnosis-and-recovery kernel in a protected region of said OS instance and to allocate memory space for storing information during a failure of said OS instance.

19. The apparatus of claim 17, wherein said diagnosis-and-recovery kernel automatically attempts to repair said failed OS instance, and
   if said failed OS instance can be repaired, said firmware reloads the repaired OS instance and passes control back to said repaired OS instance for resuming operation without rebooting said OS instance, and
   if said failed OS instance cannot be repaired, said firmware transmits a diagnosis report of said failed OS instance.

20. The apparatus of claim 15, wherein said OS comprises an OS instance implemented on a SMP (Symmetric Multi-Processor) server with LPARs (Logical PARtitions), including a hypervisor firmware that oversees the LPAR instances, said apparatus automatically performing diagnosis executed in the same LPAR instance as the LPAR of the OS instance where a failure has been detected.

21. A mechanism to attempt to automatically recover a failed operating system (OS) instance on a computer or LPAR, said mechanism comprising:
   a detector that provides an indication that an OS instance has failed;
   a diagnosis-and-recovery kernel embedded in a protected region of said OS instance; and
   memory space allocated for automatically storing information during a failure of said OS instance,
   wherein, upon said OS instance having been detected as failed, said diagnosis-and-recovery kernel is caused to automatically perform a diagnosis of said OS failure, using said automatically-stored information, and attempts to automatically repair/recover said failed OS, based on said diagnosis, without rebooting.

22. A computer, comprising a SMP (Symmetric Multi-Processor) server with LPAR (Logical PARtitioning) capability, said computer comprising:
   a plurality of processors, each said processor capable of implementing at least one LPAR having a operating system (OS) instance;
   a hypervisor firmware overseeing instances of OSs on the LPARs; and
   the automatic recovery mechanism of claim 21.

* * * * *